May 19, 1936.  C. W. SEWELL  2,041,268
BRAKE MECHANISM
Filed June 15, 1933   2 Sheets-Sheet 1
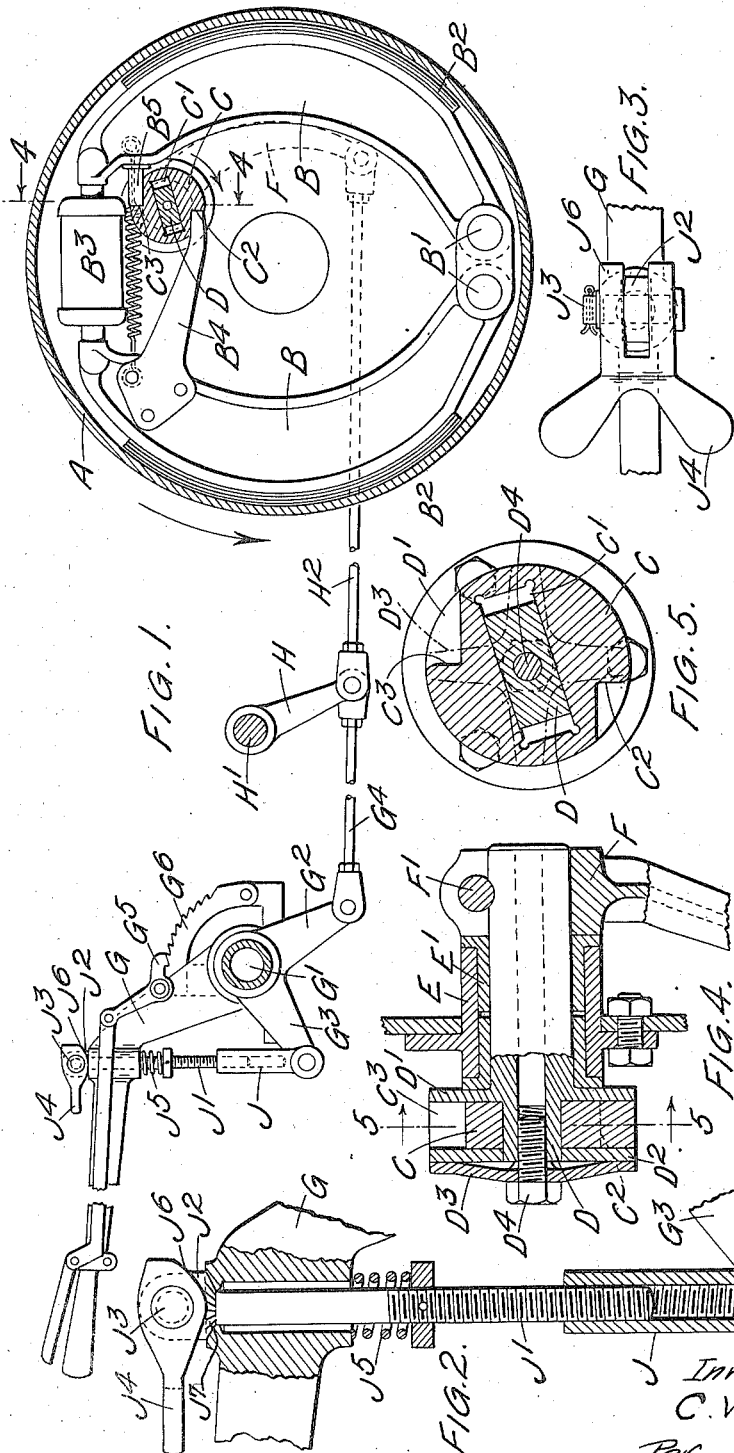

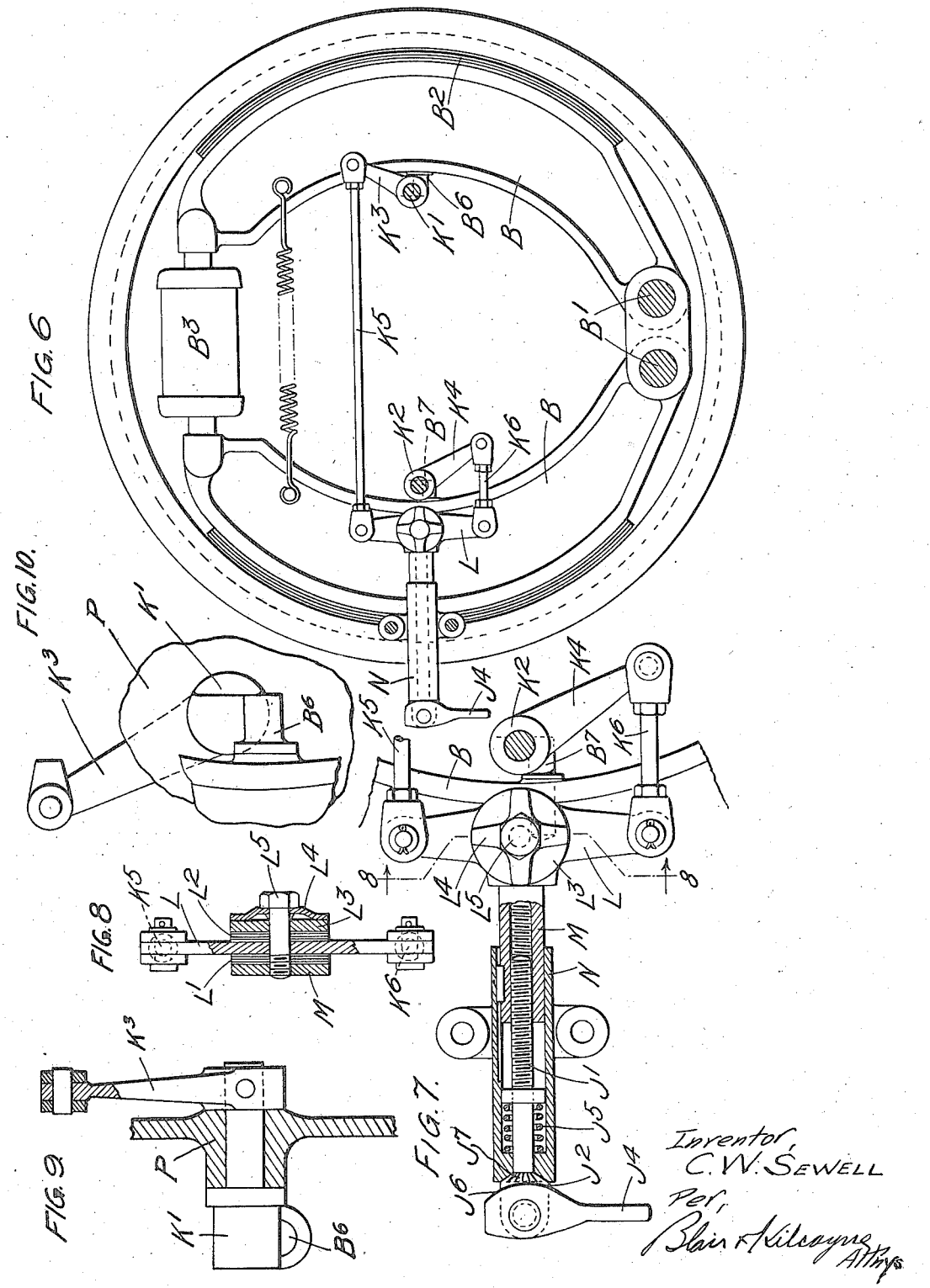

Patented May 19, 1936

2,041,268

UNITED STATES PATENT OFFICE 2,041,268

BRAKE MECHANISM

Charles William Sewell, London, England, assignor to D. Napier & Son Limited, London, England, a registered company of Great Britain Application June 15, 1933, Serial No. 676,003
In Great Britain May 15, 1933

17 Claims. (Cl. 188—196)

This invention relates to brake compensating means for adjusting one brake shoe in relation to another, and an object of the invention is to provide improved means for automatically balancing the adjustment of one brake shoe in relation to that of another.

According to the present invention brake compensating means for automatically adjusting one brake shoe in relation to another comprises in combination differential mechanism arranged to be capable of a common movement imparted to it by an operating member and serving to apply both shoes together and of a differential movement to ensure equal application of the two shoes, and friction means operating on the differential mechanism so as to permit differential movement when the brakes are applied by the common movement and thereby to balance the shoes but to resist differential movement when the brakes are released so that the balance is not destroyed.

Where the mechanism is applied to hydraulically-operated brakes the common movement of the differential mechanism may either serve only for adjustment purposes or may serve also for operation of the brakes by mechanical means. Thus the invention can conveniently be embodied in a brake system in which the brakes of all four wheels are operated hydraulically by the brake pedal while the rear brakes only are operated mechanically by the hand lever. Conveniently, in such a case, the compensating mechanism serving to compensate the two shoes in one of the front brake drums is only given a common movement for purposes of adjustment and normally serves only to adjust the stops which determine the released positions of the brake shoes. In the rear brake drums, on the other hand, the differential mechanism besides serving as stops to determine the position of the shoes when released serves also for applying the brakes mechanically by means of the hand lever.

The invention is particularly applicable to the compensation of two shoes mounted so as to operate upon the same brake drum.

In one form of the invention the compensating means comprises a differential member mounted so as to be capable of sliding transversely but not rotating on a rotatable operating spindle, and so acting on two brake shoes that while rotation of the member with the spindle imparts movement to both shoes transverse movement of the member with respect to the spindle ensures substantially equal application of both shoes, and friction means tending to resist such transverse movement for the purpose set forth. Conveniently the differential member has on it opposed abutments or cam surfaces engaged by followers operatively connected respectively to the two shoes and mounted so that their direction of movement has such a component in the direction of the transverse movement that while rotation of the cam with the spindle applies both shoes, the transverse movement of the member with respect to the spindle ensures substantially equal application of the two shoes.

An alternative arrangement comprises a differential lever pivoted at a point intermediate in its length to an operating member and having its ends so operatively connected respectively to the two brake shoes that bodily movement of the lever and pivot serves to apply both shoes while rocking of the lever about the pivot ensures substantially equal application of the two shoes, and friction means tending to resist such rocking for the purpose set forth.

In a modification of the invention the brake mechanism comprises the combination with adjusting mechanism of spacing mechanism in series therewith having "normal" and "adjusting" positions and so constructed and arranged that when moved from its normal to its adjusting position it tightens the brake by a predetermined amount corresponding to the clearance desired for the brakes when released, and vice versa.

The invention enables the brakes to be adjusted by the following simple method. The spacing mechanism is first moved to the tighter of its two positions referred to herein as its "adjusting" position, the adjusting mechanism is then gradually tightened until the brakes are applied either fully or to an extent that can be accurately determined, and finally the spacing mechanism is returned to its slacker position herein referred to as its "normal" position. Thus whatever wear may occur to the brake linings the adjustment brings the shoes in their released position to a definite spacing from the fully applied position which is sufficient to provide the desired clearance between the shoes and the drum but is sufficiently small to ensure that the application of the brakes will take place when the operating lever is moved a short distance from the released position.

The invention is applicable to hydraulically-operated brakes as well as to mechanically-operated brakes and those arranged to be operated alternatively by hydraulic or mechanical means. In the case where mechanical operation is provided it will be appreciated that the adjusting means can be arranged to tighten or slacken the operating means. Where the brakes are arranged for alternative operation by hydraulic and mechanical means the mechanical operating means conveniently affords stops to determine the normal positions of the brake shoes when released by the hydraulic operating means and the adjusting means will then serve to tighten or loosen the mechanical operating means and hence the position of these stops. Where the brakes are operated only hydraulically the adjusting means are conveniently arranged to adjust the position of stops which determine the normal released positions of the brake shoes.

In one form of the invention locking means is provided to lock the continuous adjusting mechanism against movement and is so associated with the spacing mechanism as to be unlocked only when the spacing mechanism is in its adjusting position. This ensures that the continuous adjusting mechanism cannot be operated to apply the brakes with the spacing mechanism in its normal position which would result in the brakes being permanently applied.

Preferably the adjusting mechanism is also provided with an operating member which is movable into and out of an operative position and is so connected with the spacing mechanism that the latter is moved automatically to its adjusting position when the handle is moved to its operative position, and vice versa. Thus, for example, the handle may serve to release the lock mentioned above so that it is only necessary to pull the handle up into its operative position to release the lock and move the spacing means to its adjusting position, then to turn it till the brakes are fully applied and finally to fold it down into its inoperative position, thereby releasing the brakes and locking the adjusting means against further movement.

In one form of the invention the mechanism comprises a screwthreaded member arranged to tighten the mechanism continuously by moving a cooperating screwthreaded member longitudinally, and a handle pivoted to the end of the screwthreaded member and having on it a cam bearing upon a normally stationary member so that as the handle is moved to the position convenient for rotating the screwthreaded member the cam imparts a longitudinal movement thereto to tighten the brakes temporarily.

The invention may be carried into effect in many ways but one specific embodiment will now be described by way of example with reference to the accompanying drawings, in which Figure 1 is a somewhat diagrammatic view of mechanism for adjusting and compensating a hydraulic brake and also operating it by hand mechanically, Figure 2 is an enlarged view of the adjusting means shown in Figure 1, Figure 3 is a further enlarged view of the adjusting handle shown in Figure 2, as seen from the top of that figure, Figure 4 is an enlarged section of the compensating means shown in Figure 1 on the line 4—4 of that figure, Figure 5 is a section on the line 5—5 of Figure 4, Figure 6 is a somewhat diagrammatic view on a larger scale than Figure 1 of mechanism for adjusting and compensating a hydraulic brake without provision for mechanical operation, Figure 7 is an enlarged view of the adjusting and compensating mechanism shown in Figure 6, Figure 8 is a section on the line 8—8 of Figure 7, and Figures 9 and 10 are detail views on an enlarged scale of parts shown in Figures 6 and 7.

As shown in Figure 1, the brake comprises the usual brake drum A within which is a pair of shoes B pivoted at their lower ends $B^1$ and provided with friction linings $B^2$. At their upper ends they are provided with the usual operating cylinder $B^3$ containing pistons which are forced apart by the admission of liquid under pressure to operate the brake hydraulically. As is customary in such constructions, the arrangement for admission of the liquid is such that when the hydraulic operating means is released ports are opened so that any loss of liquid in the system will be made up from a reservoir, thus adjusting the hydraulic operating means automatically in relation to the normal released position of the shoes. Since such an arrangement is well known it is not thought necessary to show details of it herein. The adjusting and compensating mechanism according to this invention, in so far as it relates to the hydraulic operation of the brakes, operates by adjustment of the stops which determine the normal released position of the shoes.

As shown in Figure 1, the compensating mechanism comprises a cam C having in it a slot $C^1$ through which extends a parallel-faced operating spindle D. The width of the slot is greater than the width of the parallel faces of the spindle so that the cam can slide transversely on the spindle in the direction of the parallel faces. The cam is shaped so as to afford two opposed cam surfaces or abutments $C^2$ and $C^3$ which engage respectively with followers in the form of arms $B^4$ and $B^5$ secured to the upper ends of the brake shoes.

Thus it will be seen from Figure 1 that if the cam C is rocked in a clockwise direction by rocking of the flattened spindle D, both brake shoes will be applied. On the other hand, if the cam slides transversely on the spindle, one brake shoe will be applied while the other will be released.

The mechanism is provided with friction means tending to prevent such transverse movement and to retain the cam C in whatever position it may take up on the spindle. Thus if the brakes are applied by rotating the flat spindle D and one shoe encounters substantial resistance before the other, the action of the friction means will be overcome and the cam will shift transversely imparting a differential movement to the shoes so that both are applied substantially equally. When the brakes are released, however, the cam will, owing to the friction means, remain in the position which it has now taken up with respect to the spindle and in a subsequent application of the brakes both shoes will be applied equally.

The details of the friction means are shown in Figures 4 and 5, from which it will be seen that the spindle D, which is only flattened at its inner end, passes through a fixed bearing $E^1$ afforded by a fixed part E of the brake and is secured at its outer end to an operating lever F by means of a pin $F^1$. At its inner end it has a flange $D^1$ against which the cam C fits and a washer $D^2$ which is pressed against the cam by means of a star spring washer $D^3$ held in position by a bolt $D^4$ screwed into the end of the spindle D. Thus the pressure on the cam C tends to resist any lateral movement and to maintain the slot $C^1$ in its existing position relative to the flattened spindle D. Hence if one brake shoe is tighter than another and the brakes are applied, the cam C will move laterally in response to the unequal pressure on the two faces $C^2$ and $C^3$. When the brakes are released, however, the cam will remain in its new position in relation to the spindle so that when the brakes are subsequently applied the two shoes will be applied equally.

It will be appreciated that the movement of the arm F imparting a common movement to both shoes simultaneously may either be employed only for adjusting the normal released position of the shoes so as to compensate the hydraulic operation of the brakes, or it may also be used for applying the brakes mechanically. Figure 1 shows an arrangement in which it is employed for operating the brakes mechanically by means of a hand lever G. The hand lever is pivoted at $G^1$ concentrically with a bell crank having two arms $G^2$ and $G^3$. To operate the brakes the arm $G^2$ is connected by a link $G^4$ to an arm H fixed to a shaft $H^1$, serving to communicate the movement to the brake on the opposite side of the vehicle, and by means of a link $H^2$ to the end of the arm F.

In normal operation of the brake the bell crank $G^2$, $G^3$ remains in fixed relation to the hand lever G which is held in position by means of the usual pawl $G^5$ engaging a fixed ratchet $G^6$ and serves for application of the brakes by hand.

For taking up play, means is provided for adjusting the bell crank $G^2$, $G^3$ in relation to the hand lever G. For this purpose the end of the arm $G^3$ is pivoted to an internally threaded sleeve J into which is screwed a bolt $J^1$ which passes through the hand lever G. The bolt $J^1$ has a non-circular head $J^2$ to which a wing nut $J^4$ is pivoted at $J^3$. The surface of the hand lever G is formed with a number of recesses $J^7$ into which the head $J^2$ can drop under the action of a spring $J^5$. The engagement of the head $J^2$ with such recesses prevents rotation of the bolt $J^1$. In order to permit rotation of the bolt the wing nut $J^4$ is provided with cam surfaces $J^6$ which ride on the flat surface surrounding the recesses in the hand lever G and lift the bolt head out of these recesses.

Thus in order to effect an adjustment it is only necessary to raise the wing nut $J^4$ to a vertical position from the horizontal position seen in Figure 2 and to turn it so as to raise the arm $G^3$ in relation to the arm G. When the adjustment has been made the wing nut $J^4$ is returned to the position shown in Figure 2 which permits the head $J^2$ serrated at $J^7$ to drop into corresponding serrations around the opening in the top of the lever G and lock the adjusting means against further movement.

It will be seen that in addition to locking the adjusting means this latter movement also results in slacking off the adjustment. This enables the adjustment to be very conveniently effected in the following manner. The wing nut is simply tightened with the hand lever in the fully released position until the brakes are applied. Thus any slack due to wear of the brake linings is taken up. The wing nut is then returned to the position shown in Figure 2 which has the effect of automatically releasing the brakes by a predetermined amount which is just that required to provide the desired clearance for the brake shoes.

In the construction shown in Figures 6 to 8, the compensating and adjusting mechanism serves only to adjust the stops which determine the normal released position of the shoes and is not intended to be used for mechanical operation of the brakes. The brake drum, shoes and hydraulic operating mechanism are arranged as in the previous construction. In this case, however, separate cams $K^1$ and $K^2$ are provided for the two shoes and are operated by a differential lever L. As shown in Figure 6, the cam $K^1$ is secured to an arm $K^3$ having its free end connected by means of a link $K^5$ to one end of the lever L. Similarly the cam $K^2$ is secured to an arm $K^4$ having its free end connected by a link $K^6$ to the other end of the lever L. The lever L is pivoted at its centre to an operating member M mounted to slide longitudinally in a fixed tubular guide N. As will be seen from Figure 6, the cams $K^1$ and $K^2$ bear at their lower ends respectively against studs $B^6$ and $B^7$ secured to the brake shoes so that movement of the operating member M to the left will cause application of both shoes.

Figures 9 and 10 show the connection between the cam $K^1$ and lever $K^3$. The cam $K^2$ is similarly connected to the lever $K^4$. For the sake of clarity the backing plate P shown in Figure 9 is omitted from the somewhat diagrammatic showing of Figures 6 and 7.

The adjusting means for applying both shoes simultaneously is similar in general to that described in connection with Figures 1 to 5. In this case, however, the bolt $J^1$ is screwed into the operating member M through the end of the guide N which takes the place of the hand lever G. The operating member M is keyed in the guide N so as to be prevented from rotating, and thus when the wing nut $J^4$ is rotated the operating member M is drawn into the guide N and both brake shoes are applied simultaneously.

In order to maintain the differential lever L in whatever position it may take up when the brakes are applied by means of the wing nut $J^4$, friction means is employed. The friction means consists of two friction washers $L^1$, $L^2$ one on each side of the lever L, and a washer $L^3$ which is pressed towards the operating member M by means of a star spring washer $L^4$ held in position by the bolt $L^5$ forming the pivot of the differential lever L.

Thus in order to compensate and adjust the brake shoes it is only necessary to raise the wing nut $J^4$ to the horizontal position from the vertical position shown in Figure 6 and turn it to tighten both the brake shoes simultaneously. If the shoes are not balanced one will be applied before the other and as soon as this happens the lever L will rock about its pivot against the action of the friction means and further movement will be transmitted wholly to the looser brake shoe. Tightening of the wing nut $J^4$ is continued until the brakes are fully applied, after which it is turned down into the position shown in Figure 6 resulting, as in the previous construction, in a slackening of the brakes by a definite predetermined amount. During this slackening movement the friction means retains the differential lever L in the position it has taken up and the balance of the two shoes is thus preserved.

It will be appreciated that the invention is not limited to the details of construction shown in the accompanying drawings. For example, other means may be employed for gradually tightening the brakes until they are applied and subsequently slackening them by a predetermined amount. Moreover, while the invention has been described in connection with hydraulically-operated brakes, it is equally applicable to brakes which are operated solely by mechanical means.

What I claim as my invention and desire to secure by Letters Patent is:—

1. Brake mechanism including in combination two brake shoes, an operating member, an operative connection between them comprising differential mechanism arranged to be capable of a common movement imparted to it by the operating member and serving to apply both shoes together and of a differential movement to ensure equal application of the two shoes, and friction means operating on the differential mechanism so as to permit differential movement when the brakes are applied by the common movement and thereby to balance the shoes, but to resist differential movement when the brakes are released so that the balance is not destroyed.

2. Brake mechanism including in combination two brake shoes, a rotatable operating spindle, a differential member mounted so as to be capable of sliding transversely but not of rotating with respect to said spindle and so acting on the brake shoes that while rotation of the member with the spindle imparts movement to both shoes transverse movement of the member with respect to the spindle ensures substantially equal application of the two shoes, and friction means tending to resist such transverse movement for the the purpose set forth.

3. Brake mechanism including in combination two brake shoes, a rotatable operating spindle, a differential member mounted on said spindle so as to be capable of sliding transversely but not rotating with respect thereto, opposed abutments or cam surfaces afforded by said member, followers engaging said abutments or cam surfaces and operatively connected respectively to the two shoes and mounted so that their direction of movement has such a component in the direction of the transverse movement that while rotation of the member with the spindle applies both shoes the transverse movement of the member with respect to the spindle ensures substantially equal application of the two shoes, and friction means tending to resist such transverse movement for the purpose set forth.

4. Brake mechanism including in combination a brake drum, two brake shoes operating thereon, an operating member, an operative connection between the shoes and the operating member comprising differential mechanism arranged to be capable of a common movement imparted to it by the operating member and serving to apply both shoes together and of a differential movement to ensure equal application of the two shoes, and friction means operating on the differential mechanism so as to permit differential movement when the brakes are applied by the common movement and thereby to balance the shoes, but to resist differential movement when the brakes are released so that the balance is not destroyed.

5. In brake mechanism the combination with a brake, of adjusting mechanism, spacing mechanism in series therewith having "normal" and "adjusting" positions and so constructed and arranged that when moved from its normal to its adjusting position it tightens the brake by a predetermined amount corresponding to the clearance desired for the brake when released, and vice versa, locking means to lock the adjusting mechanism against movement so associated with the spacing mechanism as to be unlocked only when the spacing mechanism is in its adjusting position, and an operating member for the adjusting mechanism which is movable into and out of an operative position and is so connected with the spacing mechanism that the latter is moved to its adjusting position when the operating member is moved to its operative position, and vice versa.

6. In brake mechanism the combination with a brake, having brake shoes and an operating lever of adjusting mechanism, spacing mechanism in series therewith having "normal" and "adjusting" positions and so constructed and arranged that when moved from its normal to its adjusting position it tightens the brake by a predetermined amount corresponding to the clearance desired for the brake when released, and vice versa, mechanical operating mechanism and hydraulic operating mechanism, the adjusting means serving to adjust the position of the shoes in relation to the position of the mechanical operating lever in the normal released condition of the hydraulic operating mechanism.

7. Brake compensating means for automatically adjusting one brake shoe in relation to another, comprising in combination differential mechanism arranged to be capable of a common movement imparted to it by an operating member and serving to apply both shoes together and of a differential movement to ensure equal application of the two shoes, and friction means operating on the differential mechanism so as to permit differential movement when the brakes are applied by the common movement and thereby to balance the shoes, but to resist differential movement when the brakes are released so that the balance is not destroyed, in combination with hydraulic operating means for the brakes, the parts of the compensating means which act on the shoes serving as stops determining the normal released positions of the brake shoes.

8. Brake compensating means for automatically adjusting one brake shoe in relation to another, comprising in combination differential mechanism arranged to be capable of a common movement imparted to it by an operating member and serving to apply both shoes together and of a differential movement to ensure equal application of the two shoes, friction means operating on the differential mechanism so as to permit differential movement when the brakes are applied by the common movement and thereby to balance the shoes, but to resist differential movement when the brakes are released so that the balance is not destroyed, hydraulic operating means for the brake, and a mechanical operating lever under the control of the driver serving for application of the brakes through the compensating means independently of the hydarulic operating means.

9. Brake-compensating means for automatically adjusting one brake shoe in relation to another, comprising in combination differential mechanism arranged to be capable of a common movement imparted to it by an operating member and serving to apply both shoes together and of a differential movement to ensure equal application of the two shoes, friction means operating on the differential mechanism so as to permit differential movement when the brakes are applied by the common movement and thereby to balance the shoes, but to resist differential movement when the brakes are released so that the balance is not destroyed, adjusting mechanism, and spacing mechanism in series therewith having "normal" and "adjusting" positions and so constructed and arranged that when moved from its normal to its adjusting position it tightens the brake by a predetermined amount corresponding to the clearance desired for the brakes when released, and vice versa.

10. Brake adjusting means comprising in combination, a brake, a pair of cooperating screwthreaded members arranged to adjust the brake by relative longitudinal movement produced by rotation of one of them, an operating member pivoted to that one of them, cam surfaces movable with said operating member, a normally stationary member upon which the cam bears so that as the operating member is moved to a position convenient for rotating the screwthreaded member to which it is pivoted the cam imparts a longitudinal movement to the latter to tighten the brakes temporarily by a predetermined amount, and cooperating projections and recesses so afforded respectively by the rotatable screwthreaded member and said stationary member as normally to be interengaged and lock the said screwthreaded member against rotation but to be disengaged by the longitudinal movement consequent upon moving the operating member to its operative position.

11. Brake mechanism comprising in combination hydraulic operating means, and adjusting mechanism and spacing mechanism in series with each other and in parallel with the hydraulic operating means, such adjusting and spacing mechanism acting through stops so as to determine and adjust the normal released position of the brakes without affecting the relative position of the operating means corresponding to a given position of the brake shoes, the spacing mechanism having "normal" and "adjusting" positions and being so constructed and arranged that when moved from its "normal" to its "adjusting" position it moves said stops by a predetermined amount corresponding to the clearance desired for the brakes when released, and vice versa.

12. Brake mechanism comprising in combination hydraulic operating means including two members each actuating a brake shoe and both subject to the hydraulic pressure in the same chamber which moves them in opposite directions, and adjusting mechanism and spacing mechanism in series with each other and in parallel with the hydraulic operating means, such adjusting and spacing mechanism acting through two stops each determining the normal released position of one of the brake shoes without affecting the relative positions of the hydraulic operating members corresponding to given positions of the shoes, the spacing mechanism having "normal" and "adjusting" positions and being so constructed and arranged that when moved from its "normal" to its "adjusting" position it moves the stops by a predetermined amount corresponding to the clearance desired for the brakes when released, and vice versa.

13. In brake mechanism the combination with a brake of adjusting mechanism, spacing mechanism in series therewith having "normal" and "adjusting" positions and so constructed and arranged that when moved from its normal to its adjusting position it tightens the brake by a predetermined amount corresponding to the clearance desired for the brake when released, and vice versa, and means for moving the spacing mechanism, independently of the movement of the adjusting mechanism, from its normal position to its adjusting position, and retaining it therein irrespective of movement of the adjusting mechanism to tighten or slacken the brake.

14. In brake mechanism the combination with a brake of adjusting mechanism, spacing mechanism in series therewith having "normal" and "adjusting" positions and so constructed and arranged that when moved from its normal to its adjusting position it tightens the brake by a predetermined amount corresponding to the clearance desired for the brake when released, and vice versa, means for moving the spacing mechanism, independently of the movement of the adjusting mechanism, from its normal position to its adjusting position, and retaining it therein irrespective of movement of the adjusting mechanism to tighten or slacken the brake, and locking means to lock the adjusting mechanism against movement so associated with the spacing mechanism as to be unlocked only when the spacing mechanism is in its adjusting position.

15. Brake mechanism comprising, in combination, a brake, a pair of cooperating screwthreaded members arranged to adjust the brake by relative longitudinal movement produced by relative rotation, and a cam adapted to move one of the screw-threaded members longitudinally by a predetermined amount from a "normal" to an "adjusting" position, independently of relative rotation between the members, so as to tighten the brake temporarily by a predetermined amount corresponding to the clearance desired for the brakes when released, and to retain it in such position irrespective of relative rotation between the screw-threaded members to tighten or slacken the brake.

16. Brake mechanism comprising, in combination, a brake, a pair of cooperating screwthreaded members arranged to adjust the brake by relative longitudinal movement produced by rotation of one of them, an operating member pivoted to that one of them, cam surfaces movable with said operating member, and a normally stationary member upon which the cam bears so as to move the rotatable screw-threaded member from a "normal" to an "adjusting" position, independently of the rotation thereof, so as to tighten the brakes temporarily by a predetermined amount as the operating member is moved to a position convenient for rotating the said screw-threaded member and to retain the latter in its adjusting position irrespective of rotation to tighten or slacken the brake.

17. In brake mechanism, the combination with a brake of adjusting mechanism, spacing mechanism in series therewith having "normal" and "adjusting" positions and so constructed and arranged that when moved from its normal to its adjusting position it tightens the brake by a predetermined amount corresponding to the clearance desired for the brake when released, and vice versa, and an operating member capable of an adjusting movement to operate the adjusting mechanism and of a spacing movement, which moves the spacing mechanism to its adjusting position and retains it therein irrespective of the adjusting movement to tighten or slacken the brake.

CHARLES WILLIAM SEWELL.